Figure 1:
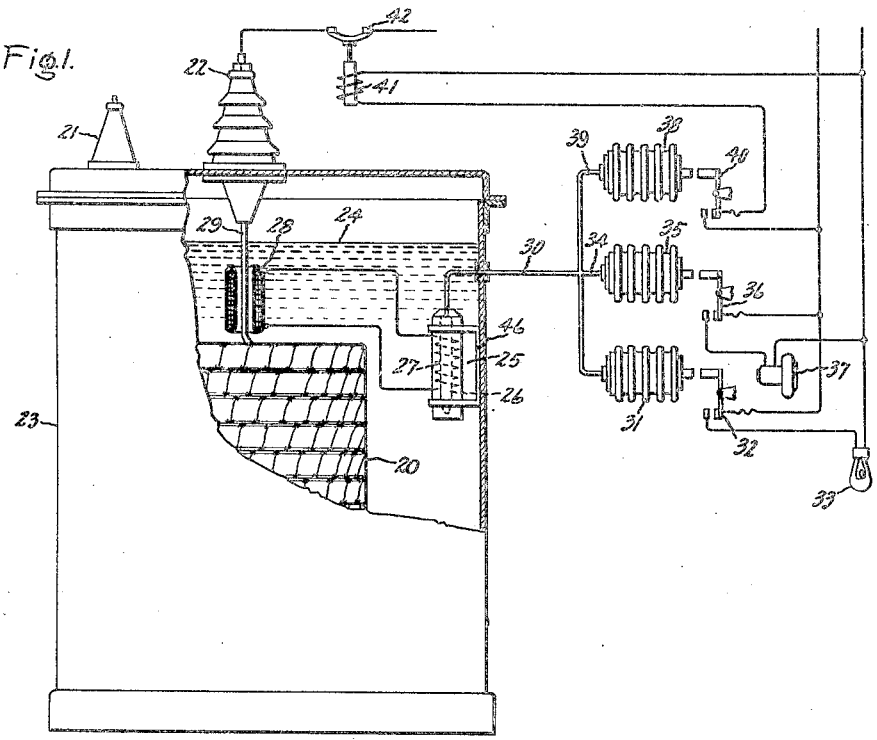

Dec. 20, 1949     G. CAMILLI ET AL     2,491,798
PROTECTED ELECTRICAL APPARATUS
Filed Jan. 5, 1944     5 Sheets-Sheet 1

Inventors:
Guglielmo Camilli,
Vincent M. Montsinger,
John J. Chapman,
by Harry E. Dunham
Their Attorney.

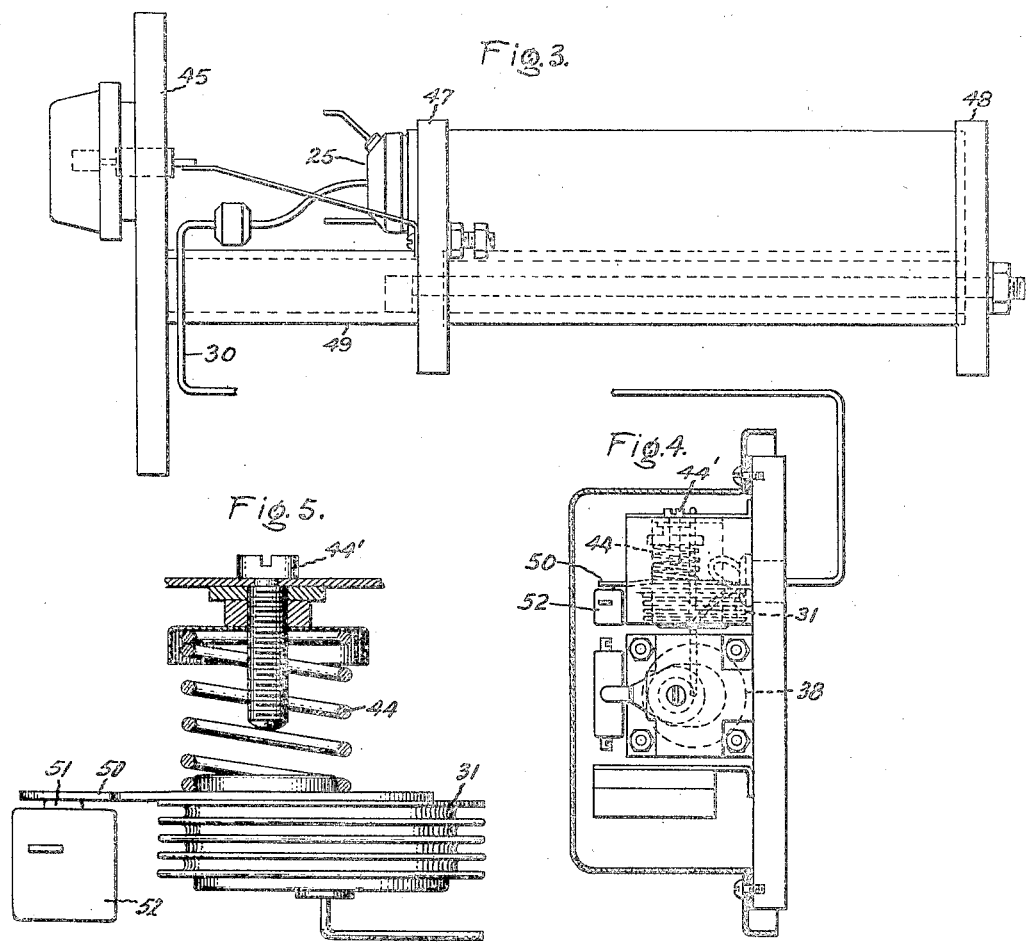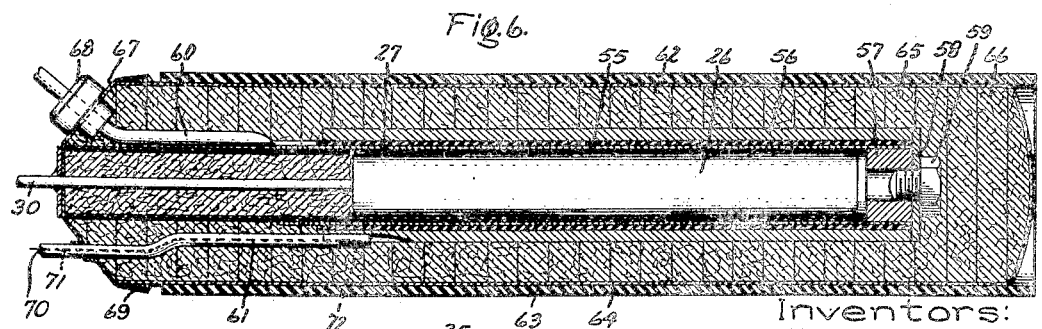

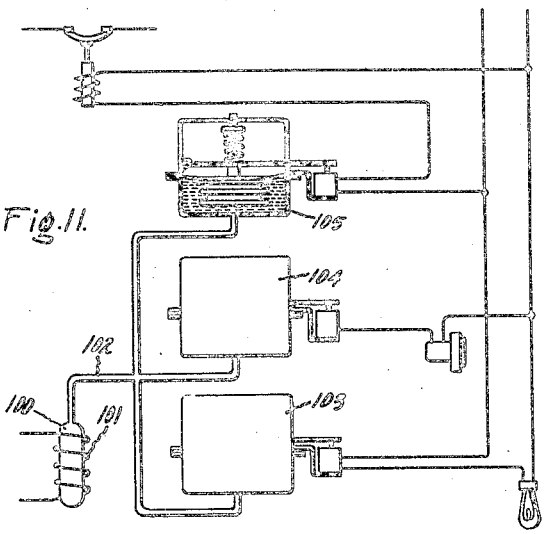
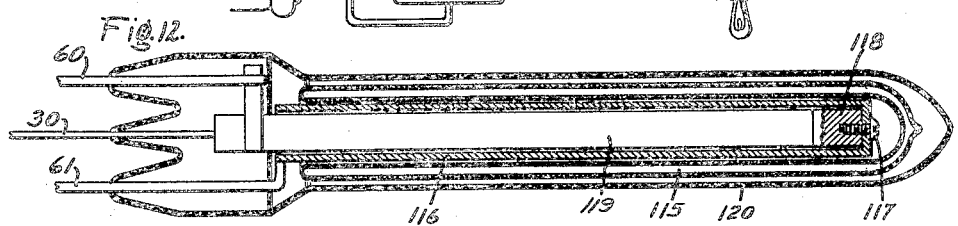
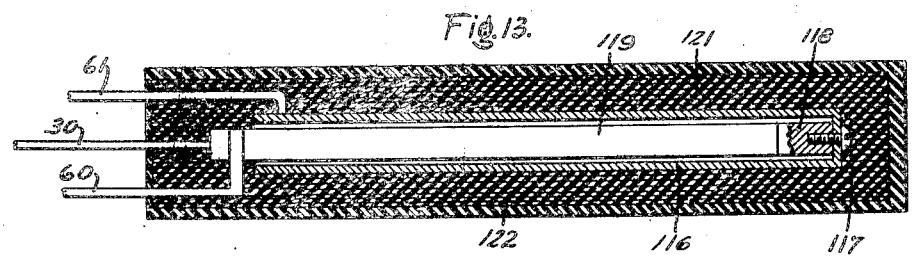
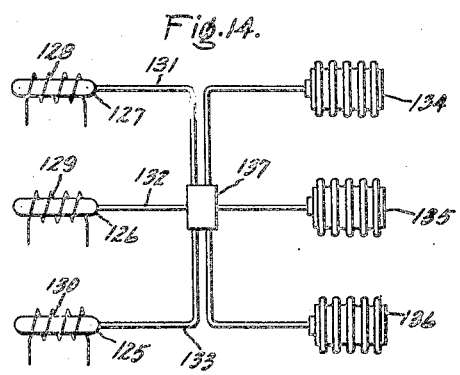

Patented Dec. 20, 1949

2,491,798

UNITED STATES PATENT OFFICE 2,491,798

PROTECTED ELECTRICAL APPARATUS

Guglielmo Camilli, Vincent M. Montsinger, and John J. Chapman, Pittsfield, Mass., assignors to General Electric Company, a corporation of New York Application January 5, 1944, Serial No. 517,046

15 Claims. (Cl. 175—294)

Our invention relates to protected electrical apparatus such as electrical energy translating devices including electrical induction apparatus, and to an improved arrangement for protecting the apparatus or operating the apparatus under overloads of various durations of time.

Heretofore it has been customary to obtain an indication of the hot spot temperature of electrical induction apparatus, such as transformers, through the use of a thermal responsive device in the top oil which is also heated by a heating coil in response to the current carried by the transformer, such a device being disclosed in Patent 1,156,680—Fortesque. A relay responsive to such a thermal responsive device may give an indication of the temperature of the coils or may turn on cooling fans or may operate breaker relays to disconnect the transformer from the circuit. It has also been known that there is a thermal gradient between the temperature of the winding and the temperature of the cooling fluid such as the oil surrounding the winding, and in order to have a protective device which operates in response to hot spot temperature, thermal responsive devices have been used which are intended to duplicate the hot spot temperature.

However, it has been known for some time that electrical induction apparatus, such as transformers, may carry a higher overload for short periods of time than may be carried for long periods of time, and the excess transformer capacity usually depends upon several factors, such as follows:

(1) Thermal time constant of the transformer
(2) Temperature rise of the transformer winding over oil
(3) Temperature rise of the oil over ambient
(4) Ambient air temperature
(5) Temperature limit allowed after the transformer has carried a given overload for a given time
(6) Ratio of copper to iron loss In view of the fact that transformers may carry different amounts of overloads depending upon the duration of the time the overload is employed, and also since it is sometimes desirable under rare emergency conditions to operate a transformer at overloads that may use up as much as 1 per cent of its life per operation, the following has been recommended by the A. I. E. F. Transformer Sub-Committee for the hot spot temperatures and overloads of self-cooled transformers following full load:

Table

| Duration of Load (In hours) | Hot Spot Temp., Deg. C. | Times Rated Load In— | |
|---|---|---|---|
| | | 30 Deg. Ambient | Zero Deg. Ambient |
| 1 | 137 | 1.9 | 2 |
| 2 | 130 | 1.7 | 2 |
| 4 | 125 | 1.5 | 1.80 |
| 8 | 120 | 1.35 | 1.65 |
| 24 | 110 | 1.25 | 1.55 |

However, since relays which are connected to operate in response to the thermal responsive device which is heated by the oil and in response to winding current usually operate at a fixed temperature, the use of only an ordinary hot spot temperature indicator and an ordinary relay is impractical, since the relay would operate relatively quickly at the fixed temperature and could not distinguish between long time and short time overloads, and hence such a device would operate too quickly in a short time range.

In order to overcome this difficulty of employing a hot spot indicator or thermal responsive device which duplicates the hot spot temperatures, it has been suggested to vary the characteristics of the indicator or thermal responsive device so that it will run cooler than the hot spot copper temperature, and thus to allow the hot spot temperature to rise to some value above that of the thermal responsive device before the transformer is disconnected from the circuit. However, such prior devices of this type have not sufficiently accurately duplicated the overload or hot spot temperature as shown by the above table and such devices apparently do not operate similarly in summer and winter. For instance, as is mentioned in Patent 2,320,929, such devices will operate to permit the transformer to reach a higher temperature in winter than in summer.

It is therefore an object of our invention to provide an improved protective arrangement for an electrical energy translating device or an electromagnetic induction apparatus which will permit suitable overloads at both short and long intervals and for different ambient temperatures.

Another object of our invention is to provide an improved protected electrical induction apparatus which is simple in construction, easy to manufacture, and efficient in operation.

A further object of our invention is to provide an improved protective device which will give predetermined overload characteristics for an electrical induction apparatus.

Figure 2:
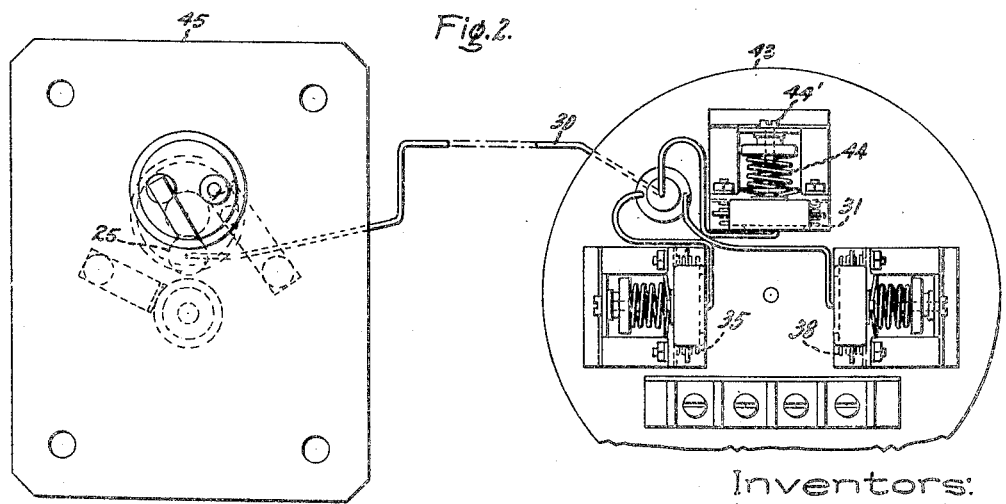
Figure 7:
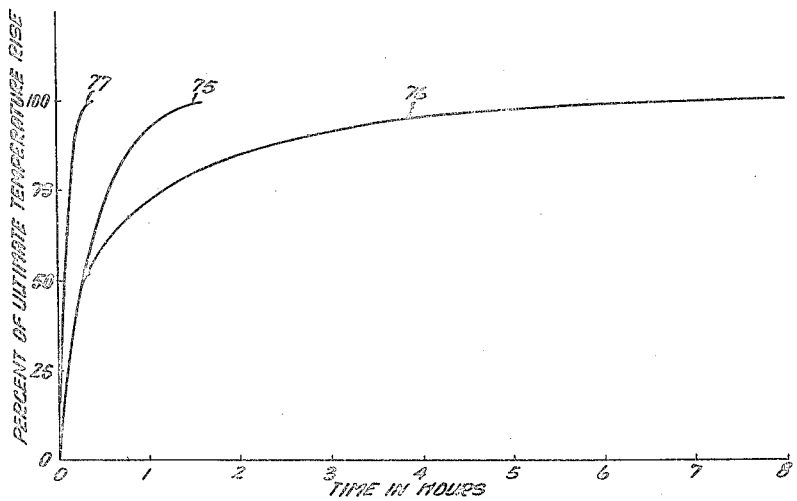
Figure 10:
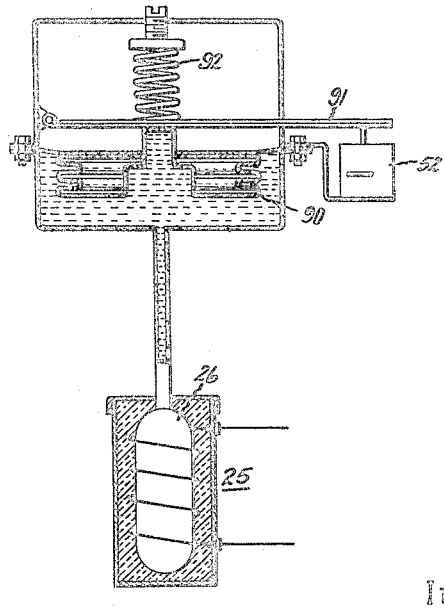
Figure 8:
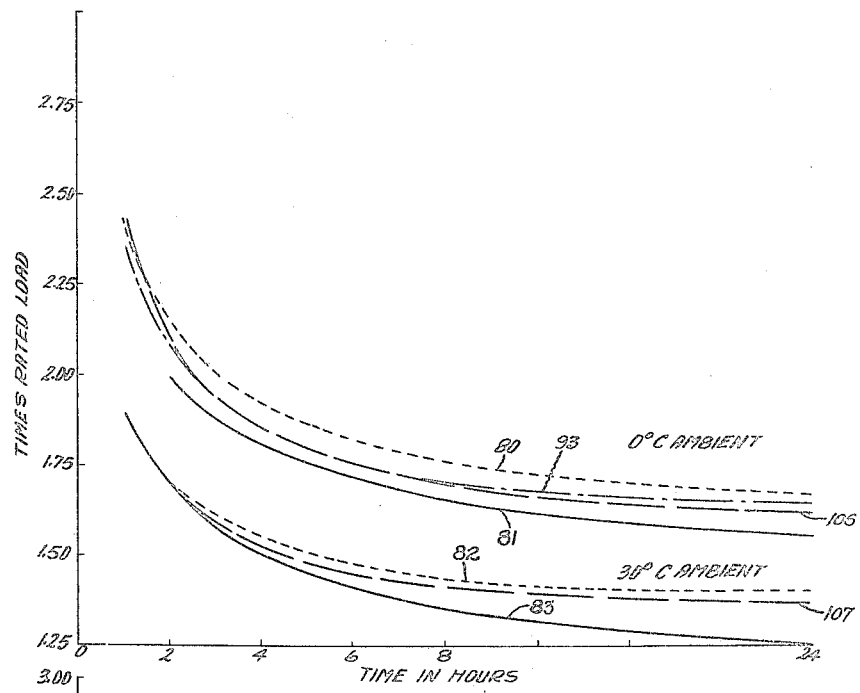
Figure 9:
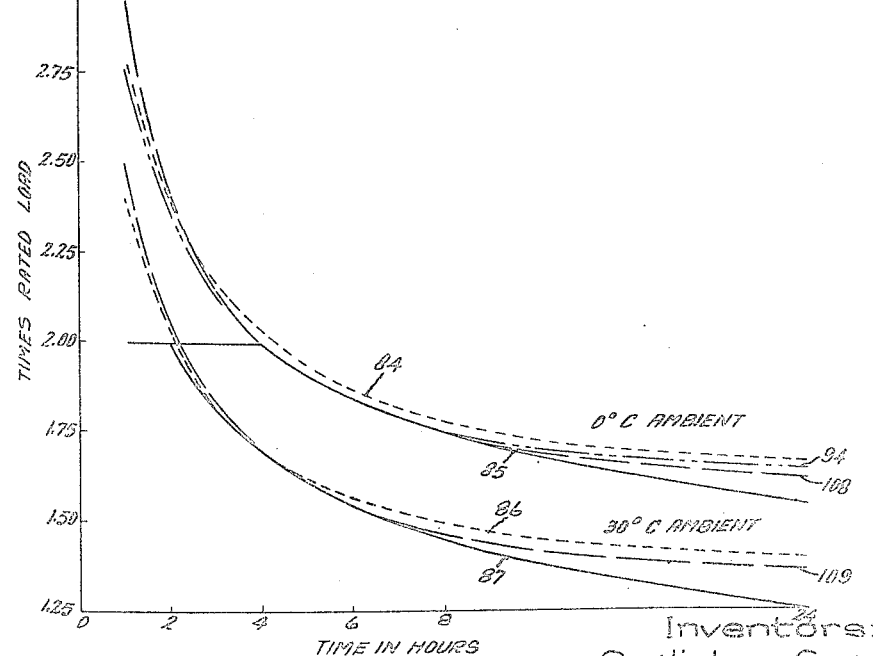

In the drawing, Fig. 1 is a side elevation in partial section of an electrical induction apparatus which is provided with an embodiment of our invention; Fig. 2 is a top view of a modified form of thermal relay employed with the protected apparatus of Fig. 1; Fig. 3 is a side view of the thermal responsive device employed in the relay of Fig. 2; Fig. 4 is a side view of the suitable portion of the thermal responsive relay shown in Fig. 2; Fig. 5 is an enlarged detail view of part of the device shown in Fig. 4; Fig. 6 is a detail sectional view of our improved thermal responsive device shown in Fig. 3; Figs. 7, 8 and 9 are characteristic curves which will be used in the description of our invention; Fig. 10 is a sectional side elevation of a modified thermal responsive device and relay; Fig. 11 illustrates partially diagrammatically a modification of the protective system illustrated in Fig. 1; Figs. 12 and 13 illustrate modifications of the thermal responsive device illustrated in Fig. 6, and Fig. 14 illustrates somewhat diagrammatically a modification of the protective system illustrated in Fig. 1.

Referring more particularly to Fig. 1 of the drawing we have illustrated a protected electrical apparatus such as a transformer which includes a conventional winding 20 having a relatively low voltage bushing 21 and a relatively high voltage bushing 22. The winding is surrounded by an enclosing casing 23 which is filled with a suitable dielectric or cooling fluid 24 such as transil oil or a chlorinated aromatic hydrocarbon such as the type disclosed in Clark Patent 2,041,594 issued May 19, 1936 and which is assigned to the same assignee as this present invention.

In order to operate a thermal responsive device in response to a function of a suitable temperature of the apparatus, such as the hot spot winding temperature so that the apparatus may operate along any suitable predetermined overload-time curve, we provide a protective device including a thermal responsive device 25 which will be described more in detail in relation to Fig. 6. The thermal responsive device includes a suitable arrangement responsive to a change in temperature such as a bulb 26 which is heated in response to a function of the load or coil current by means of a heating coil which is diagrammatically illustrated at 27 in Fig. 1, the heating coil being connected to a secondary 28 of a current transformer, the primary of which includes a conductor 29 which carries a load current. Also, since the thermal responsive device is immersed in a portion of the oil such as the top oil, it also will be in heat exchange relation to or will be affected by the surrounding oil. A tube 30 connects to the top of the bulb 26 which in turn connects with a suitable bellows 31. The bulb 26, tube 30, and bellows 31 provide a closed system of the conventional type which is filled with a fluid, typically a vapor which changes in pressure with changes in temperature. The bellows 31 may be of the conventional type which after any predetermined amount of expansion will operate a switch 32 to accomplish any desired function such as to turn on a signal lamp 33. Any suitable number of bellows may be employed, and in the construction shown in Fig. 1 we have illustrated the tube 30 connected through the tube 34 to a second bellows 35 which through a switch 36 operates fans 37 which may be turned on when the temperature of the transformer reaches any suitable temperature. It is to be understood that the fans may be situated to blow air over the transformer radiators. A third bellows 38 is connected to the tube 30 through a tube 39, the bellows being arranged to operate a switch 40 which in turn energizes a relay 41 which opens the circuit breaker 42 in the transformer line.

The bellows and switch constructions which we have somewhat diagrammatically shown in Fig. 1 may be of any suitable construction, and as shown in Fig. 2, three similar bellows and switch sets are provided which may be supported on a base member 43. A suitable biasing spring 44 is provided in the conventional manner for each bellows so as to set the temperature at which the bellows will operate. The spring force may be varied by turning a bolt 44'. The thermal responsive device 25 is also supported through a suitable member 45 which is attached to the bracket 46 which is carried by the side walls of the casing 23. The thermal responsive device 25, as illustrated in Fig. 3, may be supported in any suitable manner such as through a pair of end members 47 and 48 which are in turn connected to a rod 49 which extends from the member 45. There is also illustrated in Fig. 4 another view of the switch portion of the relay and in Fig. 5, in further detail, one of the bellows and switch units. The switch includes an operating arm 50 which is attached to the bellows 31, which operating arm is operatively connected at the opposite end to a movable member 51 of the switch 32 which is indicated in the box 52. The switch may be of any suitable construction such as of the type described in Patent 2,332,911, Hausler, issued October 26, 1943, and which is assigned to the same assignee as this present invention.

Since thermal relays, which include bellows, such as 31, usually operate at the same temperature without regard to the time in which the temperature has been attained, if the hot spot temperature of the transformer is to be allowed to reach higher values under short time operations than under longer time operations, as has been mentioned above, the temperature rise of the bulb 26 over the oil temperature must increase at a slower rate than does the hot spot rise over this same oil when the overload comes on. In other words, when an overload is applied to the transformer, if the transformer coil heats up more rapidly than the bulb 26, the coil will be allowed to reach a hotter temperature before the bulb causes one of the switches to operate. Now the factor that determines the rate of temperature rise, for a given ultimate rise, of any device such as the transformer winding 20 or the heating coil 27 is called the thermal time constant, which is considered the length of time required for such a device to reach 63% of its final temperature when load is applied. In a transformer the time constant is a function of such factors as the heat storage capacity of the oil, the insulation, and the steel and copper that must be heated before the temperature reaches its final temperature. Therefore, the greater the time constant the greater the short time overload. The time constants of the transformer windings are much shorter, however, than the time constants of the surrounding oil, the former being of the order of around 3 to 7 minutes in a wide variety of transformers which are now manufactured, while the time constant of the oil may be of the order of several hours. It will also be understood that the transformer capacity depends upon the temperature differential or gradient between the copper and the oil after the transformer has reached the constant temperature at rated load. The smaller this gradient the greater the short time overload capacity for a predetermined limit of copper temperature. Of course, the temperature of the oil is also dependent upon the ambient which in our northern climates is much colder in winter than in summer. Thus the lower the air temperature the more heat that can be dissipated from the transformer tank and therefore greater overloads can be carried for a given winding temperature in winter than in summer. How much overload a transformer can carry depends upon the maximum allowable temperature for the particular transformer and insulation employed, and the figures given above in the table are for transformers insulated with the conventional cellulose insulating material. The recommended short time overloads mentioned above are based on the 8 degree rule, which assumes that the life of the transformer insulation is approximately halved for each 8 degrees centigrade increase in temperature, or assuming a sacrifice in the life of the insulation of not more than 1 per cent of the normal life expectancy for each period of operation.

It has been known that in order to obtain higher hot spot temperatures for short time overloads that the temperature of the thermal responsive device may be made to increase more slowly than the hot spot temperature. However, with such prior devices not only have they been unable to obtain satisfactory overload-time characteristics, but devices of this character have been open to the other objection, that they allow too great an overload temperature in winter as compared with that allowed in summer, or in other words they were not ambient temperature compensated. Thus in order to provide a protective device including a thermal responsive arrangement which will give suitable predetermined overload-time characteristics we provide a thermal responsive device which has a time constant greater than about four times the time constant of the transformer winding or above approximately 20 to 35 minutes in constant temperature oil, and we have found a suitable time constant for the thermal responsive device to be employed with various conventional types of transformers which are manufactured today to be in the order of about 25 minutes. The relation of the time constant, the amount of watt loss at initial temperature, and the thermal capacity of the device to be heated is given by the equation:

$$B = \frac{C\theta_f}{W} \qquad (1)$$

where

B = time constant
C = thermal capacity of the material to be heated
$\theta_f$ = the temperature rise after conditions have become constant, and
W = the watt loss at initial temperature Thus in order to obtain a high time constant it is necessary to reduce the number of watts for a given temperature rise, or it is necessary to obtain a large temperature rise for a given value of watts to be dissipated, and it is desirable to have an arrangement with a relatively high thermal capacity. Any suitable arrangement may be employed for producing such a time constant, and in the arrangement shown in the drawing, and as particularly illustrated in Fig. 6, the thermal responsive device 25 includes the bulb or temperature responsive device 26 which is surrounded by the heating element 27. In order that the watts input may be relatively small, the heating element 27 is made of relatively low conductivity material such as stainless steel and suitable insulation 55 in the form of a plurality of layers of cellulosic material is provided between the heating element 27 and the bulb 26. In order that the thermal responsive device will have a relatively high thermal capacity we provide a tubular member 56 which surrounds the heating element 27 and which has a relatively high thermal capacity with respect to that of the heating element 27. The tube 56 may be of any suitable construction and as will be seen in Fig. 6 includes a relatively thick tubular member composed of steel or brass. In order to provide a convenient arrangement for also electrically connecting the heating element 27 in the circuit, the base of the heating element 27 is attached to a metallic thimble 57, and a plate 58 is provided over the adjacent ends of the tube 56 and which in turn is connected to the thimble 57 through a bolt 59. A conductor 60 is connected to one end of the heating element 27 and another terminal is provided by a conductor 61 which connects with the tubular member 56.

In order that only a minimum number of watts input in the heating element 27 will produce a maximum increase in temperature rise of the bulb 26 we provide suitable insulation or lagging around the device which includes insulation 62 which fills up the space between the outer cylinder 56 and a surrounding enclosing casing or can 63. Suitable insulation 64 may also be provided if desired around the enclosing can 63. It will be understood that in order to provide, in production, thermal responsive devices which have not only similar but predictable thermal characteristics, it is desirable to have a convenient way of gauging the amount of heat insulating material 62 which is placed in the thermal responsive device. So as to be able to control in a production set up, therefore, the amount of insulation which is placed in each thermal responsive device which is manufactured after the unit which includes the bulb 26 and surrounding heating element 27 and tubular member 56 has been placed in the can 63, washers 65 of suitable pressed material such as felt may be slipped over the outer surface of the cylinder 56 and inside the casing. By counting the number of washers which are employed the operator can produce a device with a predetermined thermal characteristic. It is to be understood that a suitable number of larger washers 66 may be provided in the base of the can 63 before the unit including the enclosing tubular member 56 is inserted. A cover 67 may then be employed which has suitable openings for accommodating the terminals 60 and 61 and the tube 30. An insulating bushing 68 may be provided for insulating the relatively high voltage terminal 60 from the metallic can cover 67.

So that the thermal characteristics of the temperature responsive device will not change in operation since it is immersed in oil, the enclosing casing should be relatively fluid tight and it will be understood that the cover 67 may be attached to the can in any suitable manner, such as by soldering, as is indicated at 69. Also, suitably tight connections may be provided between the can cover and the bushing terminals and tube 30. In order to provide a convenient way of testing the tightness of the thermal responsive device after it has been manufactured, the low voltage terminal 61 is made hollow so that suitable pressure such as air pressure may be introduced through the bore 70 in order to see that the seals are tight. In order to calibrate the device, a thermocouple wire 71 may be provided which passes through the hollow tubular member 61 which is soldered to the end as is indicated by the number 72.

In determining the characteristics of a thermal device like 25, one may consider that the transient thermal performance of the device is quite similar to that of a transformer winding since it is immersed in heated oil and develops an internal temperature rise over oil which must be added to the oil temperature to obtain the temperature of the heating element. In calculating the transient thermal performance of a transformer winding it is usually possible to neglect the effect of the rate of change of oil temperature on the temperature rise of the winding above the oil because of the relatively low thermal time constant involved in the transfer of heat from the transformer winding to the oil. For a thermal device having a considerably greater time constant than the normal transformer winding, in calculating the transient thermal performance it is necessary to consider the influence of the rate of change of the oil temperature upon the temperature rise of the device over oil. This causes the temperature rise of the device over oil to be much slower during short time overloads than it would otherwise be in oil at a constant temperature, which makes a device of this nature well suited to control short time overloads.

In order to illustrate the effect of rising oil temperature on the time required for a thermal device having a relatively large time constant, such as one formed according to our invention, to reach ultimate conditions, we have illustrated in Fig. 7 the time constant curves of a thermal device formed according to our invention with constant oil temperature and with increasing oil temperatures. In Fig. 7 the per cent ultimate temperature rise is plotted on the ordinate axis and time in hours on the abscissa. Curve 75 in Fig. 7 illustrates the time-temperature rise characteristic of a thermal responsive device formed according to our invention, the device being immersed in oil at constant temperature. It will be noted that curve 75 reaches 63 per cent of its ultimate temperature in about 25 minutes. Curve 76, however, illustrates the characteristics of a similar thermal responsive device except being immersed in oil the temperature of which is increasing under overload conditions, and it will be seen that its time constant is about 60 minutes and reaches ultimate temperatures in a matter of several hours. For comparative purposes curve 77 is included which gives the time constant curve of a conventional heating coil, the constant of which is approximately equal to that of the transformer winding at either constant or increasing temperatures of the oil which is about 4 or 5 minutes.

The thermal device 25 may be considered as including an assembly of a loss producing element 27 and a temperature sensitive element 26 having thermal capacitance. This assembly is surrounded by a thermal insulation which also has distributed thermal capacitance. It will be assumed that the heating element can be represented thermally by a suitable value of thermal capacitance and a suitable value of thermal resistance without distributed capacitance. From this assumption it follows that the heating element will have a thermal time constant which can be readily determined as a product of the thermal capacitance and thermal resistance. The thermal time constant can also be determined by making a heat run on the device immersed in oil of a constant temperature, with constant loss generated in the heating element, and with the heating element starting with the temperature of the oil. Under these circumstances the time constant can be determined as the length of time required to reach ultimate heating element rise over oil if the initial rate of rise were maintained, or as the length of time required to reach 63% of the ultimate heating element rise over oil.

The watts generated in the heating element is equal to the sum of the watts absorbed and the watts transferred to the oil. When the oil temperature is rising the watts absorbed by the heating element includes two components: (1) watts required to raise the temperature at the same rate as the oil temperature, and (2) the watts absorbed due to its rate of rise over the oil temperature. These relations can be expressed as follows:

$$P = C\frac{d\theta}{dt} + \frac{C\phi_u}{B_0}\left(e^{-\frac{T}{B_0}}\right) + \frac{\theta}{R} \quad (2)$$

The following symbols are used:

$\theta$ = Temperature rise in deg. C of heating element over oil at any time, T.

$\theta_u$ = Ultimate temperature rise in deg. C of heating element over oil for the overload under consideration = R×P.

$\theta_0$ = Temperature rise in deg. C of heating coil over oil at start of overload.

$B_c$ = Time constant of heating coil in minutes = R×C.

C = Thermal capacity of heating element in watts—minutes per deg. C.

R = Thermal resistivity of heating coil in deg. C per watt $\phi_u$ = Ultimate temperature rise in deg. C of transformer oil for the overload under consideration over the temperature at start of overload $B_0$ = Time constant of transformer oil in minutes P = Watts generated in relay during overload T = Time in minutes e = 2.718

F = Factor allowing for effect of distributed thermal capacity of the heating element K = Constant of integration Multiplying both sides by R and substituting $\theta_u$ for RP, and $B_c$ for RC:

$$B_c\frac{d\theta}{dt} + \theta = \theta_u - \frac{B_c\phi_u}{B_0}\left(e^{-\frac{T}{B_0}}\right) \quad (3)$$

Solving for $\theta$:

$$\theta = \theta_u + K\left(e^{-\frac{T}{B_c}}\right) - \left(\frac{B_c}{B_0 - B_c}\right)\theta_u\left(e^{-\frac{T}{B_0}}\right) \quad (4)$$

The first term on the right-hand side of Equation 4 is the ultimate heating element temperature rise over oil which will be realized if the overload is maintained until the conditions are constant. The second term is an exponential transient of relatively high decrement. K can be determined by considering conditions at T=0. The third term is a long time transient which represents an amount by which the temperature rise of the heating coil is depressed in rising oil on account of the thermal time-constant of the heating element.

In order to apply Equation 4 to a heating element with distributed thermal capacity, it is necessary to determine a thermal time constant which can be used to represent the performance of the relay. Such a time constant can be closely approximated by measuring the time constant by one of the usual methods, and inserting a correction factor F in the Equation 4 we obtain the following equation:

$$\theta = \theta_u + K\left(e^{-\frac{T}{B_c}}\right) - \left(\frac{FB_c}{B_0 - FB_c}\right)\theta_u\left(e^{-\frac{T}{B_c}}\right) \quad (5)$$

The correction factor F can best be determined by comparing test measurements with Equation 5.

When T=60 or greater, the term $$K\left(e^{-\frac{T}{B_c}}\right)$$

can be neglected.

In order to illustrate the temperature or times rated load versus time characteristics of our improved protective system we have illustrated in Figs. 8 and 9 the characteristics of our arrangement as compared with the recommended emergency overload characteristics. Fig. 8 illustrates the times rated load current versus time in hours following full load while Fig. 9 illustrates similar characteristics following no load. Times rated load is plotted on the ordinate axis and the time in hours on the abscissa axis, and the characteristics are given for a 30 degree ambient and for a zero degree ambient. Curve 80 illustrates the characteristics of our protective system employing the thermal responsive arrangement as is particularly described in relation to Fig. 6 for a zero degree ambient, while curve 81 is the recommended times rated load-temperature curve. Curve 82 gives a similar characteristic with a 30 degree ambient temperature while curve 83 is the recommended curve under similar conditions.

In Fig. 9 curve 84 gives the characteristics of our improved system including the thermal responsive device as is shown particularly in Fig. 6 for a zero deg. ambient, while curve 85 is the recommended load curve. Curve 86 gives a similar characteristic for our improved device with a 30 degree ambient temperature, while curve 87 is the recommended curve under similar conditions.

It will be seen, for instance, in Fig. 8 that the characteristics of our arrangement described above following full load are higher than the recommended values particularly in a zero degree ambient, while the characteristics following no load follow the recommended curves fairly close up to around 6 hours, after which time the characteristics according to the features of our invention described above give higher overload values. It appears that the reason for this is that the temperatures are nearly enough constant in 8 hours time to produce (with the small differences in load permitted by the relay for 8 and 24 hours) approximately the same hot spot temperatures as against the difference of 10 degrees C. in the recommended values of 120 deg. C. for 8 hours and 110 deg. C. for 24 hours, as is shown in the table. Both the 24 hour loads and the hot spot values may be reduced by insulating the heating element, that is, lagging the thermal responsive device 26 sufficiently to produce, if desirable, a 24 hour temperature lag. It seems reasonable to assume that in most emergencies lasting 24 hours or more, the daily peak load will not be more than 8 hours. Furthermore, as these overloads are intended for rare emergency conditions once a year or less often, the amount of aging at somewhat higher than recommended values for the full 24 hours is considered by some operators to be acceptable.

In order to shift the curves downwardly for ambient temperatures below a predetermined value, such as 30 deg. C., so that the apparatus will not be allowed to produce quite as high a times rated load as is described above, we may employ a relay outside the transformer which is responsive to the thermal responsive device 26, the relay outside the transformer being ambient temperature compensated in any suitable manner, for instance, as is shown in Fig. 10. An ambient temperature compensated relay will cause the relay to close its contacts or operate the switch more quickly at lower ambient temperatures. Thus, in Fig. 10 we have illustrated the relay which includes a bellows 90 which operates the switch 52 through an operating arm 91 which may be made of bimetal so as to be responsive to ambient temperature. A spring member 92 may be employed so as to control the setting. Any suitable amount of ambient temperature correction may be employed, and a 4 degree C. ambient temperature correction is desirable to use with this heavily lagged thermal responsive device of the type illustrated in Fig. 6. Thus the construction as is shown in Fig. 10 produces a times rated load time characteristic as shown by the curves 93 and 94 in Figs. 8 and 9 respectively for zero ambient temperature. It is to be understood that the curves may be lowered still more by employing a larger ambient correction than the 4 degrees. By 4 degrees ambient temperature corrected we mean a relay that closes its contacts 4 degrees lower when the ambient is zero than when it is 30 degrees.

If a sufficient amount of ambient temperature correction is employed suitable times rated load time characteristics may also be obtained with a thermal responsive device without heavy lagging. Such a construction is illustrated in Fig. 11 in which there is illustrated a thermal responsive device 100 immersed in the transformer oil and which is heated by a heater 101 which is connected to a current transformer as shown in Fig. 1, there being substantially no lagging or insulation between the heater and the surrounding oil. Such a bulb 100 may connect through a tube 102 to three suitable bellows 103, 104, and 105, which may be of the type illustrated in Fig. 10, and which are ambient temperature corrected. When employing 8 degree ambient temperature correction with a system as is illustrated in Fig. 11 the characteristics in Fig. 8 following full load are shown by the curves 106 and 107 for zero and 30 degrees ambient, respectively. It will be seen that beyond about 8 hours this produces a lower characteristic apparently since it has a greater ambient temperature correction and a lower temperature rise for a given current input than the heavily lagged device. In Fig. 9 curves 108 and 109 give the characteristics of the system as is illustrated in Fig. 11 for zero and 30 degree ambient, respectively.

As was mentioned above, any suitable type of thermal responsive device other than the one shown in Fig. 6 may be employed to produce a desirable lagging of the temperature responsive bulb and the heating coil, and in Figs. 12 and 13 we have illustrated modifications of the construction as is shown in Fig. 6. Fig. 12 differs from Fig. 6 primarily in the nature of the lagging or heat insulation which is employed. As shown in Fig. 12, this heat insulation is a thermos bottle like vacuum cup 115. The elements inside this cup are a relatively high thermal capacity tube 116 which corresponds to the element 56 of Fig. 6 and which has an electrical terminal or lead 61. This tube is connected by means of a screw 117 and a conducting plug 118 to a low thermal capacity heater element 119 which corresponds to the element 27 of Fig. 6. Inside of the heater element 119 is a thermally responsive bulb corresponding to the bulb 26 of Fig. 6 and which has a tube 30 leading therefrom. The thermal device shown in Fig. 12 is enclosed in a protective casing 120 which is hermetically sealed.

In Fig. 13 the parts 116, 117, 118 and 119 correspond with those shown in Fig. 12 but the lagging or heat insulation is paper 121 or other cellulosic material which is permeable by the transformer oil, and the entire unit is enclosed in a cup or casing 122 of conventional organic insulating material, such as Herkolite. The thermal device shown in Fig. 13 is not hermetically sealed and due to the fact that the surrounding oil permeates it it has a larger diameter so as to provide more effective lagging or heat insulation.

In order to provide an arrangement for operating any one of three phases of a single transformer or any phase of three single phase transformers, we provide an arrangement as is illustrated in Fig. 14. This arrangement includes three bulbs 125, 126 and 127, which are placed in any suitable manner in the oil, such as adjacent each of the phases of a three phase transformer with the heating coils 128, 129 and 130 being adapted to be connected to the phases in the same manner described above in relation to Fig. 1. These bulbs are then connected through tubes 131, 132 and 133 to bellows 134, 135 and 136. It will also be seen that the tubes are fluidly connected together at 137. It will be understood that the three bellows may operate a light, fans, and turn off the transformer in the same way described above in connection with Fig. 1. It will be seen that any one of the bulbs may operate any one of the three bellows and thereby obtain an operation of the protected apparatus in response to a function of any one of the three phases or by any one of the single phase transformers of a three phase system.

Although we have shown and described particular embodiments of our invention, we do not desire to be limited to the particular embodiments described, and we intend in the appended claims to cover all modifications which do not depart from the spirit and scope of our invention.

What we claim as new and desire to secure by Letters Patent of the United States is:

1. In an electrical energy translating device having a winding with a time constant of about five minutes. a cooling fluid therefor, a thermally responsive device in heat exchange relation to a portion of the cooling fluid adapted to be heated by said device, means for heating said thermally responsive device in response to current of said translations device, said thermally responsive device having thermal capacity and thermal resistance producing a thermal time constant at fixed fluid temperature of at least about 20 minutes, and means responsive to said thermally responsive device for operating protective means for said translating device.

2. In an electric induction apparatus, an insulated winding, an enclosing casing, a cooling fluid in said enclosing casing and surrounding said winding, thermally responsive means within said casing and immersed in said fluid, means for heating said thermally responsive device in proportion to current flowing through said winding during operation of the apparatus, said thermal responsive device having thermal resistance and capacitance providing a thermal time constant of at least about 3 times that of said winding, relay means outside said casing and operative in response to a temperature of said thermally responsive device, and a second thermally responsive means for modifying the operation of said relay means for changes in ambient temperatures.

3. In a protected electric induction apparatus, an insulated winding, a casing enclosing said winding, cooling fluid in said casing, and protective means for said apparatus including a temperature responsive device, heater means in heat exchange relation with said temperature responsive device and adapted to be heated in response to current flow through said winding, means surrounding said heater means and having a relatively high thermal capacity with respect to that of said heater and thermal resistance means surrounding said heater and high thermal capacity means, and means responsive to a predetermined temperature of said temperature responsive device for operating protective means for said apparatus.

4. In a protected electric induction apparatus, an insulated winding, a casing enclosing said winding, cooling fluid in said casing, and protective means for said apparatus including a temperature responsive device, heater means in heat exchange relation with said temperature responsive device and adapted to be heated in response to current flow through said heater means, means surrounding said heater means and having a relatively high thermal capacity with respect to that of said heater, and thermal resistance means surrounding said heater and high thermal capacity means, fluid impervious means surrounding said thermal resistance means so as to prevent fluids from permeating said thermal resistance means and thereby changing the time constant of said thermal responsive device, and means responsive to a predetermined temperature of said temperature responsive device.

5. A protective device for an electrical apparatus including a temperature responsive device, heater means in heat exchange relation with said temperature responsive device, a substantially hermetically sealed casing around said temperature responsive device and heater means so as to prevent cooling fluid from said apparatus from permeating said device and changing the thermal time constant thereof, and relatively high and low voltage leads connected to said heater means and passing through said casing, one of said leads being hollow so that fluid under pressure may be introduced into said casing to test the efficiency of the hermetically sealed casing.

6. In a protected electric induction apparatus, a plurality of insulated windings, casing means enclosing said windings, cooling fluid surrounding said windings, protective means for said apparatus including a plurality of bulbs, heater means surrounding each of said bulbs, each of said heater means being adapted to be heated in response to the current flow through a different one of said windings, a plurality of bellows outside said casing and adapted to be responsive to different temperatures of said apparatus, and means for fluidly connecting each of said bulbs with each of said bellows so that any one of said bulbs can operate any one of said bellows.

7. In a protected electrical apparatus, a plurality of insulated windings, and a protective means for said apparatus including a plurality of thermal responsive devices each being responsive to the temperature of a different winding, a plurality of relays adapted to operate under different operative conditions of said apparatus, and means for operatively connecting said thermal responsive devices to said relays so that any one may operate any one of said relays.

8. In combination, an insulated electrical winding having a predetermined thermal time constant, cooling fluid surrounding said winding, protective means for said winding including a thermal responsive device immersed in said fluid, said thermal responsive device having a thermal time constant of the order of three times the thermal time constant of said winding, and means for heating said thermal responsive device in proportion to the current flowing through said winding.

9. An electrical system comprising, in combination, an electromagnetic induction apparatus subject to heating under load and adapted to operate under varying load and ambient temperatures, said apparatus having an element subject to aging at a rate which increases with increasing temperature, a control means for controlling the loading said apparatus to permit overloads and to limit the larger overloads to shorter periods of time in accordance with a predetermined load-time curve, said control means including an auxiliary heater for providing a local temperature which is related to the temperature of said aging element, protective means responsive to a predetermined temperature of said auxiliary means, and means for rendering the operation of said control means generally independent of variations in said ambient temperature.

10. In combination, a liquid immersed transformer having an insulated winding, a thermal element in said liquid, a circuit controller actuated by said element when said element attains a predetermined temperature which is substantially less than the temperature of said winding, means for heating said element in accordance with the load current of said transformer, and a linear characteristic means for causing said element to withhold actuation of said circuit controller during the same short time transformer overloads under different ambient temperature conditions.

11. An electrical system comprising, in combination, an electromagnetic induction apparatus subject to heating under load and adapted for operation under varying loads and ambient temperatures, said apparatus having solid insulation subject to aging at an increased rate with increasing temperature, and control means for controlling the loading of said apparatus to permit overloads for such periods as correspond generally to a predetermined amount of aging of said solid insulation, said control means including an auxiliary element heated by the load current of said apparatus to attain an ultimate temperature substantially lower than the ultimate temperature of the hottest spot of said solid insulation but having generally the same time constant as said solid insulation, protective means arranged to operate in response to a predetermined temperature of said auxiliary means, and thermostatic means responsive to changes in said ambient temperature and arranged to modify the operation of said protective means to compensate for the effect of changes in said ambient temperature.

12. A thermally protected transformer having a predetermined continuous load capacity and adapted to permit short time overloads for a length of time which is a predetermined inverse function of its temperature comprising, a load carrying winding immersed in a cooling fluid in heat exchange relationship therewith, a protective element for said winding, a thermally responsive element immersed in said fluid in heat exchange relationship therewith for operating said protective element when said thermally responsive element reaches a predetermined temperature, means for heating said thermally responsive element in response to the load current in said winding, said thermally responsive element having a different temperature-time characteristic than said winding so as to permit said winding to rise under over-loads to higher temperatures for shorter periods of time, and means responsive to ambient temperature variations for so modifying said protective element that it operates at varying predetermined temperatures of said thermally responsive element in order to compensate for the effect of varying ambient temperatures on the relationship between the temperature of said winding and the temperature of said thermally responsive element.

13. Thermally responsive overload protective means for a variable load current carrying insulated winding which is in heat exchange relation with a cooling liquid in an enclosing tank comprising, in combination, an actuatable protective device outside said tank, a thermally responsive element inside said tank and in heat exchange relation with said liquid, means for interconnecting said device and element so that said device will be actuated when said element attains a predetermined temperature, an electric heater for said element, means for energizing said heater in direct proportion to the load current in said winding throughout the operating range of said protective means, the thermal capacity and thermal resistance of said element and its heater being so different from the corresponding characteristics of said winding that the temperature rise of said element over the temperature of said liquid is always less than the temperature rise of said winding over the temperature of said liquid, and thermally sensitive means outside said tank responsive to variations in ambient temperature for modifying the response of said protective device to said thermally responsive element in such a way that a decreasing ambient temperature will lower the temperature of said thermally responsive element at which said device is actuated.

14. The combination with an encased liquid filled power transformer having a winding with a thermal time constant equal to about five minutes in constant temperature liquid and to about twenty minutes in rising temperature liquid of a thermal protective device including a main actuating thermal device in said liquid, means for heating said device above the temperature of said liquid in proportion to the load current of said transformer, and such an amount of thermal insulation surrounding said device and its heating means that the thermal time constant of said device is about twenty minutes in constant temperature liquid and about two to two and one-half hours in rising temperature liquid whereby its ultimate temperature rise over the temperature of the liquid is attained in about eight to ten and one-half hours following an increase in load on said transformer and means responsive to a decrease in ambient temperature for lowering the temperature setting of said thermal protection device.

15. A protective thermal relay for liquid immersed stationary induction apparatus comprising, in combination, a thermal responsive device in said liquid, a heater for heating said device above the temperature of said liquid in proportion to the load current of said apparatus, and thermal insulation surrounding said device and heater, the amount of heat supplied to said device by said heater and the amount of said thermal insulation being so proportioned that said device attains its ultimate temperature rise above the liquid temperature during the application of any given overload on said apparatus only after the temperature of said liquid has substantially stopped increasing as a result of said overload, and means responsive to changes in ambient temperature for correspondingly changing the temperature setting of said protection thermal relay.

GUGLIELMO CAMILLI.
VINCENT M. MONTSINGER.
JOHN J. CHAPMAN.

REFERENCES CITED

The following references are of record in the file of this patent:

UNITED STATES PATENTS

| Number | Name | Date |
|---|---|---|
| 1,597,771 | Dann | Aug. 31, 1926 |
| 1,682,395 | Miller et al. | Aug. 28, 1928 |
| 1,699,752 | Randall | Jan. 22, 1929 |
| 1,717,216 | Isaac | June 11, 1929 |
| 1,917,087 | Blume | July 4, 1933 |
| 1,934,958 | White | Nov. 14, 1933 |
| 2,046,578 | Parks et al. | July 7, 1936 |
| 2,053,944 | Cooney | Sept. 8, 1936 |
| 2,155,371 | Anderegg et al. | Apr. 18, 1939 |
| 2,196,442 | Maynard | Apr. 9, 1940 |
| 2,320,929 | Hodnette | June 1, 1943 |
| 2,329,614 | Holmes | Sept. 14, 1943 |
| 2,354,529 | Ludwick | July 25, 1944 |
| 2,403,372 | Jackson | July 2, 1946 |